(12) United States Patent
Mink et al.

(10) Patent No.: US 6,291,384 B1
(45) Date of Patent: *Sep. 18, 2001

(54) HIGH ACTIVITY CATALYST PREPARED WITH ALKOXYSILANES

(75) Inventors: Robert I. Mink, Warren; Thomas E. Nowlin, West Windsor, both of NJ (US)

(73) Assignee: Mobil Oil Corporation, Fairfax, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/901,816

(22) Filed: Jul. 28, 1997

Related U.S. Application Data

(63) Continuation-in-part of application No. 08/540,143, filed on Oct. 6, 1995, now abandoned, which is a continuation-in-part of application No. 08/151,666, filed on Nov. 15, 1993, now Pat. No. 5,470,812, which is a continuation-in-part of application No. 07/788,386, filed on Nov. 6, 1991, now Pat. No. 5,336,652.

(51) Int. Cl.$^7$ ................................. C08F 4/02; C08F 4/58
(52) U.S. Cl. ..................... 502/107; 502/104; 502/118; 502/120; 502/125; 526/124.3; 526/124.5; 526/124.6
(58) Field of Search .................... 502/125, 126, 502/115, 119, 120, 107, 118; 526/124.3, 124.5, 124.6

(56) References Cited

U.S. PATENT DOCUMENTS

| | | | |
|---|---|---|---|
| 4,113,654 | 9/1978 | Mayr et al. | 252/429 C |
| 4,212,961 | 7/1980 | Kobayashi et al. | 526/151 |
| 4,263,171 | 4/1981 | Shida et al. | 252/429 C |
| 4,381,252 | 4/1983 | Sakurai et al. | 252/429 B |
| 4,383,939 | 5/1983 | Johnstone | 252/429 B |
| 4,385,161 | 5/1983 | Caunt et al. | 526/114 |
| 4,396,533 | 8/1983 | Johnstone | 252/429 B |
| 4,397,762 | 8/1983 | Johnstone | 252/429 B |
| 4,402,861 | 9/1983 | Hoff | 252/429 B |
| 4,434,083 | 2/1984 | van de Leemput et al. | 502/154 |
| 4,478,988 | 10/1984 | Pullukat et al. | 526/128 |
| 4,481,301 | 11/1984 | Nowlin et al. | 502/104 |
| 4,497,906 | 2/1985 | Hanji et al. | 502/110 |
| 4,524,140 | 6/1985 | Pullukat et al. | 502/107 |
| 4,525,469 | 6/1985 | Ueda et al. | 502/125 |
| 4,525,557 | 6/1985 | Heilman et al. | 526/128 |
| 4,530,912 | 7/1985 | Pullukat et al. | 502/104 |
| 4,530,913 | 7/1985 | Pullukat et al. | 502/104 |
| 4,540,753 | 9/1985 | Cozewith et al. | 526/88 |
| 4,558,023 | 12/1985 | Brun et al. | 502/108 |
| 4,558,024 | 12/1985 | Best | 502/115 |
| 4,562,169 | 12/1985 | Hagerty et al. | 502/107 |
| 4,565,795 | 1/1986 | Short et al. | 502/110 |
| 4,565,796 | 1/1986 | Etherton | 502/112 |
| 4,567,243 | 1/1986 | Pullukat et al. | 526/128 |
| 4,578,440 | 3/1986 | Pullukat et al. | 526/128 |
| 4,611,038 | 9/1986 | Brun et al. | 526/169.2 |
| 4,634,752 | 1/1987 | Hagerty et al. | 526/129 |
| 4,656,151 | 4/1987 | Shelly et al. | 502/113 |
| 4,665,141 | 5/1987 | Aylward | 526/86 |
| 4,672,050 | 6/1987 | Sasaki et al. | 502/116 |
| 4,678,767 | 7/1987 | Tachikawa et al. | 502/104 |
| 4,690,991 | 9/1987 | Seppala | 526/158 |
| 4,704,376 | 11/1987 | Blenkers et al. | 502/104 |
| 4,711,865 | 12/1987 | Speca | 502/116 |
| 4,716,207 | 12/1987 | Cozewith et al. | 526/169.2 |
| 4,748,221 | 5/1988 | Collomb et al. | 526/153 |
| 4,754,007 | 6/1988 | Pullukat et al. | 526/130 |
| 4,771,023 | 9/1988 | Sasaki et al. | 502/116 |
| 4,786,697 | 11/1988 | Cozewith et al. | 526/88 |
| 4,804,794 | 2/1989 | Ver Strate et al. | 585/12 |
| 4,829,038 | 5/1989 | Hoppin et al. | 502/25 |
| 4,849,390 | 7/1989 | Sano et al. | 502/113 |
| 4,916,099 | * 4/1990 | Sasaki et al. | 501/126 |
| 4,923,935 | 5/1990 | Sano et al. | 526/73 |
| 4,940,682 | 7/1990 | Sasaki et al. | 502/113 |
| 5,006,619 | 4/1991 | Pullukat et al. | 526/128 |
| 5,021,382 | 6/1991 | Malpass, Jr. | 502/117 |
| 5,023,223 | 6/1991 | Ebara et al. | 502/116 |
| 5,028,671 | 7/1991 | Kioka et al. | 526/125 |
| 5,034,365 | 7/1991 | Buehler et al. | 502/119 |
| 5,063,188 | 11/1991 | Malpass et al. | 502/116 |

(List continued on next page.)

FOREIGN PATENT DOCUMENTS

| | | |
|---|---|---|
| 0 261 808 | 8/1987 | (EP) . |
| 279586 | * 8/1988 | (EP) . |
| 4-266891 | * 9/1992 | (JP) . |
| WO 93/09147 | 11/1992 | (WO) . |
| WO 94/20546 | 3/1994 | (WO) . |
| WO 95/13873 | 11/1994 | (WO) . |

*Primary Examiner*—David W. Wu
*Assistant Examiner*—R. Rabago

(57) ABSTRACT

An ethylene-alpha-olefin copolymerization catalyst is prepared by impregnating a silica calcined at elevated temperature sequentially with an organomagnesium compound such as dialkylmagnesium compound, a silane compound which is free of hydroxyl groups, such as tetraethyl orthosilicate. A transition metal component such as titanium tetrachloride is then incorporated into the support. Unexpectedly, the calcination temperature of the silica used to prepare the catalyst precursors has a strong influence on polymer product properties. By increasing the calcination temperature of the silica from 600° to 700° C. or higher temperatures, a catalyst precursor when activated produced ethylene/1-hexene copolymers with narrower molecular weight distributions (MWD) as manifested by a decrease of resin MFR values of ~3–4 units. Activation of this catalyst precursor with a trialkylaluminum compound results in a catalyst system which is effective for the production of ethylene copolymers.

1 Claim, No Drawings

U.S. PATENT DOCUMENTS

| | | | |
|---|---|---|---|
| 5,064,799 | 11/1991 | Monte et al. | 502/115 |
| 5,106,926 | 4/1992 | Eisinger et al. | 526/88 |
| 5,112,785 | 5/1992 | Brun et al. | 502/108 |
| 5,130,283 | 7/1992 | Murata et al. | 502/116 |
| 5,143,883 | 9/1992 | Buehler et al. | 502/119 |
| 5,145,821 | 9/1992 | Buehler et al. | 502/119 |
| 5,147,839 | 9/1992 | Fujita et al. | 502/119 |
| 5,153,158 | 10/1992 | Kioka et al. | 502/126 |
| 5,177,043 * | 1/1993 | Koyama et al. | 502/125 |
| 5,191,042 | 3/1993 | Cozewith | 526/144 |
| 5,194,531 | 3/1993 | Toda et al. | 526/125 |
| 5,221,650 | 6/1993 | Buehler | 502/104 |
| 5,227,355 | 7/1993 | Seppala et al. | 502/125 |
| 5,231,151 | 7/1993 | Spencer et al. | 526/116 |
| 5,232,998 | 8/1993 | Buehler et al. | 526/125 |
| 5,244,853 | 9/1993 | Wang et al. | 502/116 |
| 5,258,342 | 11/1993 | Luciani et al. | 502/107 |
| 5,258,345 | 11/1993 | Kissin et al. | 502/116 |
| 5,275,991 | 1/1994 | Buehler et al. | 502/107 |
| 5,336,652 * | 8/1994 | Mink et al. | 502/125 |
| 5,470,812 * | 11/1995 | Mink et al. | 502/125 |
| 5,514,634 * | 5/1996 | Hagerty et al. | 502/125 |
| 5,561,091 | 10/1996 | Mink et al. | 502/115 |
| 5,939,348 * | 8/1999 | Mink et al. | 502/115 |

* cited by examiner

HIGH ACTIVITY CATALYST PREPARED WITH ALKOXYSILANES

CROSS-REFERENCE TO RELATED APPLICATION

This application is a continuation in part of application Ser. number 08/540,143 filed Oct. 6, 1995, now abandoned, which in turn is a continuation in part of application Ser. Number 08/151,666 filed Nov. 15,1993 (now U.S. Pat. No. 5,470,812), which in turn is a continuation in part of application Ser. No. 07/788,386, filed Nov. 6, 1991 (now U.S. Pat. No. 5,336,652) each of which is relied upon and incorporated by reference herein.

FIELD OF THE INVENTION

The invention relates to catalyst compositions for the production of polyethylene resins. The greatest benefits realized from the catalysts of this invention are attributable to the effect of the catalyst composition on the molecular weight distribution (MWD) of the polyolefin resin produced in a polymerization reaction in the presence of these catalysts.

BACKGROUND OF THE INVENTION

A narrow MWD of linear low density polymers is desirable as the tear strength of films blown from these resins will be much improved. The exact MWD is influenced by catalyst composition whereas the actual molecular weight is more usually altered by altering process conditions in (co) polymerization reactions.

SUMMARY OF THE INVENTION

The invention relates to controlling the MWD of polyolefin resins by controlling catalyst synthesis variables. The interaction of silica calcined at elevated temperatures, sequentially, with a dialkylmagnesium compound, for example, dibutylmagnesium (DBM), an alkoxysilane reagent preferably tetraalkyl orthosilicate, e.g., tetraethyl orthosilicate (TEOS), and $TiCl_4$ produces catalyst precursors which exhibit high activity in olefin polymerization reactions in the presence of trialkylaluminum cocatalysts.

Unexpectedly, it has been found that the calcination temperature of a silica support for these catalysts can materially affect the ratio, $I_{21.6}/I_{2.16}$ sometimes denoted simply by the acronym MFR. [$I_{21.6}$ and $I_{2.16}$ are measured according to ASTM D-1238, conditions F and E, respectively.]

One of the measures of the MWD of a linear low density polyethylene (LLDPE) or a high density polyethylene (HDPE) resin is the melt flow ratio (MFR), which is the ratio of the high-load melt index or flow index ($I_{21.6}$) to the melt index ($I_{2.16}$) of a given resin:

$$MFR = I_{21.6}/I_{2.16}$$

The MFR is an indication of the MWD of the polymer: the higher the MFR value, the broader the MWD. Resins having relatively low MFR values, e.g., of about 20 to about 30, have relatively narrow MWDs. LLDPE resins having such relatively low MFR values produce warpage-free injection-molded articles and film with better strength properties, for example improved dart drop strength, compared to those of resins with high MFR values.

A decrease in the MFR value coincides with tear strength improvement in the machine direction of linear low density polymers blown into film. At constant tetraalkyl orthosilicate levels in the catalyst precursor, there is a large decrease in resin MFR units, of 3 to 4 units, with an increase in calcination temperature of the support between 600° and 700° C. All other factors remaining constant, increasing the tetraalkyl orthosilicate levels, e.g., tetraethyl orthosilicate, in the catalyst presursor will also produce resins with lower MFR values.

DETAILED DESCRIPTION OF THE INVENTION

The invention is directed to forming certain catalysts for ethylene-olefin copolymerization reactions. In accordance with preferred embodiments of the invention, the proportions of the components of the catalyst precursor of the invention satisfy the equation wherein K value is a ratio of (transition metal)/{(Mg)+4(Si)}, wherein (transition metal) is the concentration of transition metal in units of mmol/gram of silica;

wherein (Mg) is the concentration of Mg provided by the dialkylmagnesium compound, in units of mmol/gram of silica; and wherein (Si) is the concentration of Si provided by the tetraalkyl orthosilicate in units of mmol/gram of silica, preferably equation K=[Ti]/([Mg]+4[Si]) which is less than 0.5 usually less than 0.4. The "[Ti]", "[Mg]" and "[Si]" in the formula refer to the concentrations of Ti (provided by the transition metal compound, e.g. $TiCl_4$); the concentration of Mg provided by the organomagnesium compound and the concentration of Si provided by the silane compound. The concentration of each is calculated in units of mmol/gram of silica support; outside of this K range, the toughness of the resins produced in polymerization reactions catalyzed by the catalysts of the invention and the strength of the films fabricated therefrom decline.

Suitable carrier materials for the catalyst precursors include solid, porous materials such as silica, alumina and combinations thereof. Such carrier materials may be amorphous or crystalline. These carriers may be in the form of particles having a particle size of from 0.1 micron to 250 microns, preferably from 10 to 200 microns, and most preferably from 10 to 80 microns. Preferably, the carrier is shaped in the form of spherical particles, e.g., spray-dried silica. The carrier material should be porous. The internal porosity of these carriers may be larger than 0.2 $cm^3/g$. The specific surface area of these materials is at least 3 $m^2/g$, preferably at least 50 $m^2/g$, and more preferably from, 150 to 1500 $m^2/g$.

It is desirable to remove physically bound water from the carrier material prior to contacting it with the catalyst ingredients. This water removal may be accomplished by heating the carrier material.

If the chosen carrier is porous silica, it may contain silanol groups. Silanol groups in silica may be present in an amount from about 0.5 to about 5 mmol of OH groups per gram of carrier; but the amount will vary inversely with heating (or dehydration) temperatures. That is, a relatively small number of OH (silanol) groups may be removed by heating the carrier from about 1500 to about 250° C., whereas a relatively large number of OH groups may be removed by heating at 500° to 800° C. The duration of the heating may be from 16 to at least 4 hours.

In a most preferred embodiment, the carrier is silica which, prior to the use thereof in the first catalyst precursor synthesis step, has been dehydrated by fluidizing it with nitrogen or air and heating to at least 600° C. for 4–16 hours to achieve a surface hydroxyl group concentration of about 0.7 mmol per gram. In preferred embodiments, herein the temperature of calcination is greater than 600° and up to 870° C. The surface hydroxyl concentration of silica may be determined according to J. B. Peri and A. L. Hensley, Jr., *J. Phys. Chem.*, 72 (8), 2926 (1968). Internal porosity of carriers can be determined by a method termed the BET-technique, described by S. Brunauer, P. Emmett and E. Teller in *Journal of the American Chemical Society*, 60, pp. 209–319 (1938). Specific surface areas of carriers can be measured in accordance with the above-mentioned BET-technique with use of the standardized method as described in *British Standards* BS 4359, Volume 1, (1969). The silica of the most preferred embodiment is a high surface area, amorphous silica with the surface area=300 $m^2/g$ and pore volume of 1.65 $cm^3/g$. It is a material marketed under the tradenames of Davison 952 by the Davison Chemical Division of W. R. Grace and Company, or Crosfield ES 70 by Crosfield Limited.

In fact, it has been discovered that heating the silica support at temperatures of greater than 600° C. narrows the MWD of the copolymers produced with the catalysts of the invention.

The carrier material is slurried in a non-polar solvent. Preferably, all subsequent steps for catalyst precursor preparation are conducted at temperatures of about 25° to about 80° C., preferably to about 40° to about 65° C. to ensure maximum catalyst activity.

Suitable non-polar solvents are materials which are liquid at reaction temperatures and in which all of the reactants used herein, e.g., the organomagnesium compound, the silane compound, and the transition metal compound, are at least partially soluble. Preferred non-polar solvents are alkanes, such as isopentane, n-hexane, isohexane, n-heptane, octane, nonane, and decane, although a variety of other materials including cycloalkanes, such as cyclohexane, aromatics, such as toluene and ethylbenzene, may also be employed. The most preferred non-polar solvents are isopentane, isohexane and heptane. As indicated above, the solvent should be free of electron donors and be non-polar, because electron donor(s) and polar solvents can react with the organomagnesium compound. Prior to use, the non-polar solvent should be purified, such as by percolation through silica gel and/or molecular sieves, to remove traces of water, oxygen, polar compounds, and other materials capable of adversely affecting catalyst activity.

The organomagnesium compound has the empirical formula $R_mMgR'_n$ where R and R' are the same or different $C_2$–$C_{12}$ alkyl groups, preferably $C_4$–$C_{10}$ alkyl groups, more preferably $C_4$–$C_8$ alkyl groups, and most preferably both R and R' are butyl groups, and m and n are each 0, 1 or 2, providing that m+n is equal to the valence of Mg.

In the most preferred embodiment of the synthesis of this catalyst precursor it is important to add only such an amount of the organomagnesium compound that will be deposited—physically or chemically—onto the support since any excess of the organomagnesium compound in the solution may react with the other reagents and cause precipitation outside of the support. The carrier drying temperature affects the number of sites on the carrier available for the organomagnesium compound—the higher the drying temperature lower the number of sites. Thus, the exact molar ratio of the organomagnesium compound to the hydroxyl groups in the carrier will vary and must be determined on a case-by-case basis to assure that only so much of the organomagnesium compound is added as will be deposited onto the support without leaving any excess of the organomagnesium compound in the solution. Because the molar amount of the organomagnesium compound deposited into the support is greater than the molar content of hydroxyl groups in the support, the molar ratios given below are intended only as an approximate guideline and the exact amount of the organomagnesium compound in this embodiment must be controlled by the functional limitation discussed above, i.e., it must not be greater than that which can be deposited into the support. The amount of the organomagnesium compound which is deposited into the support can be determined by adding the organomagnesium compound to the slurry of the carrier until the organomagnesium compound is detected in the liquid phase.

For example, for the silica carrier heated at about 600° C., the amount of the organomagnesium compound added to the slurry is such that the molar ratio of Mg to the hydroxyl groups in the carrier is about 1:1 to about 4:1, preferably about 1.1:1 to about 2.8:1, more preferably about 1.2:1 to about 1.8:1 and most preferably about 1.4:1.

The silane compound used in the production of the catalyst composition of the invention should be free of hydroxyl groups. The preferred species of silane compound are those defined by $Si(OR)_4$ wherein R is a $C_1$–$C_{10}$ hydrocarbyl group, preferably a hydrocarbyl group of 2 to 6 carbon atoms. Hydrocarbyl groups include alkyl, aryl, arylalkyl, alkenyl and arylalkenyl, containing 1 to 10 carbon atoms. Specific silane compounds which can be used in accordance with the invention include tetra- methoxysilane, tetraethoxysilane, tetraisopropoxysi lane, tetrapropoxysi lane, tetrabutoxysilane, tetraphenoxysilane, tetrakis(2-methoxyethoxy)silane, tetrakis(2-ethylhexoxy)silane, and tetraallyloxysilane.

The amount of the silane compound is such that the molar ratio of the silane compound to Mg is about 0.40 to about 1.00. For the preparation of higher density (at least 0.94 g/cc) polymers and copolymers of ethylene, it was discovered that the catalyst system exhibits higher activity when the catalyst precursor is prepared at a [silane]:[Mg] molar ratio at the minimum end of the range of 0.4 to 1.0, that is, at about 0.4 rather than at about 1.0.

In preferred embodiments, the silica is contacted with the dialkylmagnesium compound in a slurry of the silica in a solvent described above; thereafter to the dialkylmagnesium contacted silica slurry is added the silane compound, with subsequent addition of the transition metal, at a temperature of less than 90° C. The temperature of transition metal contact is preferably below 80° C. to minimize high temperature deactivation. All of the previous steps may be undertaken at the lower temperatures.

Alternatively, formation of the contact mixture of the organomagnesium compound, the silane compound and the inert solvent with subsequent slurrying of the carrier therein can obviate the necessity of equipment requiring high-mixing capabilities for the commercial scale-up of catalyst precursor production. Therefore, the alternative synthetic method particularly allows for a complete contact of all components on any scale. In these embodiments, the mixture of the organomagnesium compound, the silane compound and the inert solvent is prepared first and subsequently the carrier is slurried therein prior to precipitation of any components from the solution. The total amount of the silane compound may be added in one step to form the liquid mixture. However, the invention contemplates addition of only a portion of the total amount of the silane compound to the mixture with a subsequent addition of the remaining portion of the silane to the silica slurry. In accordance with the invention, it is most preferred to add all the silane compound to the slurry of carrier prior to incorporating transition metal compound into the catalyst precursor.

Finally, the slurry is contacted with at least one transition metal compound soluble in the non-polar solvent, preferably, after the addition of the silane compound is completed. We have found that it is preferred not to effect any filtration between the steps of transition metal addition and silane compound addition. A filtration between silane compound addition and transition metal addition appears to broaden the MWD of the polymerization product. This synthesis step is conducted at about 25° to about 70° C., preferably at about 30° to about 65° C., and most preferably at about 45° to about 60° C. In a preferred embodiment, the amount of the transition metal compound added is not greater than that which can be deposited onto the carrier. The exact molar ratio of Mg to the transition metal will therefore vary (depending, e.g., on the carrier drying temperature) and must be determined on a case-by-case basis. For example, for the silica carrier heated at about 200° to about 850° C., the amount of the transition metal compound is such that the molar ratio of the transition metal, derived from the transition metal compound, to the hydroxyl groups of the carrier is about 1 to about 2.3, preferably about 1.3 to about 2.3. The amount of the transition metal compound is also such that the molar ratio of Mg to the transition metal is about 0.5 to about 3, preferably about 1 to about 2. These molar ratios provide catalyst compositions which produce HDPE and LLDPE resins having relatively low MFR values in the range of about 20 to about 30. In particular, catalysts of the invention allow for the production of LLDPE resins characterized by MFR values less than 28. Films made of these LLDPE products exhibit excellent dart drop impact resistance and enhanced MD Elmendorf tear strength. As is known to those skilled in the art, such LLDPE resins can be utilized to produce high-strength film or injection molding products which are resistant to warping and shrinking.

Suitable transition metal compounds used herein are compounds of metals of Groups IVB, VB, VIB or VIII of the Periodic Table, CAS Version, Handbook of Chemistry and Physics, 68th, Edition 1987 to 1988 providing that such compounds are soluble in non-polar solvents. The preferred transition metal compounds are titanium compounds, preferably tetravalent titanium compounds. The most preferred titanium compound is titanium tetrachloride. Mixtures of transition metal compounds may also be used and generally no restrictions are imposed on the transition metal compounds which may be included. Any transition metal compound that may be used alone may also be used in conjunction with other transition metal compounds.

The transition metal compound, such as the tetravalent titanium compound is added to the slurry containing the solid intermediate and is heated to a suitable reaction temperature. The supported catalyst precursor formed from the four components described above is then activated with suitable activators. These include organometallic compounds. Preferably, the activators are trialkylaluminum compounds which contain alkyl groups of 1 to 8 carbon atoms, preferably 1 to 4 carbon atoms. More preferably, the activators are triethylaluminum or trimethylaluminum.

The catalyst may be activated in situ by adding the activator and catalyst precursor separately to the polymerization medium. It is also possible to combine the catalyst precursor and activator before introduction into the polymerization medium, e.g., for up to about 2 hours at a temperature from about −40° to about 80° C.

A suitable amount of the activator expressed as the number of moles of the activator per mole of titanium in the catalyst precursor may be from about 1 to about 100 and is preferably greater than 5.

Ethylene and alpha-olefins may be copolymerized with the catalysts prepared according to the present invention. Polymerization reactions can be carried out in suspension, in solution or in the gas phase. Gas phase polymerizations are preferred such as those taking place in stirred-bed reactors and, especially, fluidized-bed reactors. With the catalysts produced according to aspects of the present invention, molecular weight of the polymers may be suitably controlled with hydrogen when the polymerization is carried out at relatively low temperatures, e.g., from about 30° to about 105° C. This control of molecular weight may be evidenced by a positive change in the melt index of the polymer. The catalyst systems prepared according to aspects of the present invention are highly active.

The catalysts prepared according to aspects of the present invention are particularly useful for the production of HDPE and LLDPE resins with densities below 0.97 g/cc. The LLDPE resins may have a density of 0.94 g/cc or less, preferably 0.930 or less or even 0.925 g/cc or less. In accordance with certain aspects of the present invention, it is possible to achieve densities of less than 0.915 g/cc and even 0.900 g/cc.

These LLDPE resins may be polymers of ethylene with one or more $C_3$–$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers.

The MWD of the polymers prepared in the presence of the catalysts of the present invention, as expressed by the MFR value, varies from about 20 to 30, and is preferably 22–27, for LLDPE products having a density of about 0.900 to about 0.940 g/cc and an melt index value of about 0.1 to about 100. As is known to those skilled in the art, such MFR values are indicative of a relatively narrow MWD of the polymers. The relatively low MFR values of polymers prepared with the catalyst systems of this invention also indicate that they are suitable for the preparation of various film products since such films are likely to have excellent strength properties. Ethylene copolymers produced in accordance with certain aspects of the present invention preferably contain at least about 80% by weight of ethylene units. Most preferably, the LLDPE resins of the invention contain at least 2 wt. %, for example from 2 to 20 wt. % of an alpha-olefin.

Preferably, the polymerization reaction is conducted by contacting a stream of the monomers, in a gas-phase process, such as in the fluidized-bed process described below with a catalytically effective amount of the completely activated catalyst at a temperature and at a pressure sufficient to initiate the polymerization reaction.

In order to achieve the desired density ranges in the copolymers it is necessary to copolymerize enough of the alpha-olefin comonomers with ethylene to achieve a level of 1 to 5 mol percent of the $C_4$ to $C_8$ comonomer in the copolymer. The amount of comonomer needed to achieve this result will depend on the particular comonomer(s) employed.

In accordance with the invention, it has unexpectedly been found that using catalysts of the invention in a gas-phase polymerization reaction, 1-hexene can be incorporated into ethylene copolymer chains with a high efficiency:

a relatively small concentration of 1-hexene in the gas phase can lead to a relatively large incorporation of 1-hexene into the copolymers. Thus, 1-hexene can be incorporated into an ethylene copolymer chain in a gas-phase reactor in amounts up to 15% by weight, preferably 4 to 12% by weight, to produce LLDPE resins having a density of less than 0.940 g/cc.

In gas-phase polymerization in a fluidized-bed reactor, the polymerization temperature should be held below the sintering temperature of polymer particles. For the production of ethylene copolymers in the process of the present invention, an operating temperature of about 30° to 115° C. is preferred and a temperature of about 75° to 95° C. is most preferred. Temperatures of 75° to 90° C. are used to prepare LLDPE products having a density of 0.91 to 0.92 g/cc, temperatures of 80° to 100° C. are used to prepare LLDPE products having a density of 0.92 to 0.94 g/cc, and temperatures of 90° to 115° C. are used to prepare HDPE products having a density of 0.94 to 0.96 g/cc.

The fluidized-bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas. The partially or completely activated catalyst composition is injected into the bed at a rate equal to its consumption. The production rate in the bed is controlled by the rate of the catalyst injection. The feed stream of gaseous monomer, with or without inert gaseous diluents, is fed into the reactor at a space time yield of about 2 to 10 pounds/hour/cubic foot of the bed volume.

The highly active supported catalyst system of this invention yields a fluidized- bed product having an average particle size between about 0.01 to about 0.07 inches and preferably 0.02–0.04 inches.

Resins produced with catalysts of the invention exhibit excellent mechanical properties. Although there may be differences in catalyst productivity and 1 -hexene incorporation, which vary with the type of the trialkylaluminum activator used in the gas-phase fluidized-bed reactor, excellent mechanical properties of the LLDPE resins inhere in the catalyst precursors of the invention independently of the identity of the cocatalyst.

The LLDPE film exhibits unexpectedly high dart drop impact strength and enhanced MD Elmendorf tear strength compared to commercial standards.

The following Examples illustrate specific embodiments of the present invention.

EXAMPLES

Thus it is apparent that there has been provided, in accordance with the invention, a process for catalyst production, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

Example 1

Silica (515 g, ES70 produced by Crosfield Limited), which was previously calcined at 865° C. under nitrogen for 4 hours, was placed into a mix vessel. Isopentane (2575 ml) was added to slurry the silica. After heating the mixture from 50° to 55° C., DBM (515 mmol) was added to the silica slurry and the mixture was stirred for 1 hour at 50° to 55° C. Next, TEOS (340 mmol, corresponds to a TEOS loading of 0.66 mmol/g silica) was then added to the slurry and stirring was continued for 1 hour at 50° to 55° C. Finally, $TiCl_4$ (515 mmol) was added to the mixture and stirring was continued for 1 hour at 50° to 55° C. Then, the isopentane was removed under nitrogen purge at 50° to 55° C. leaving a pink-brown free-flowing powder (700 g).

Example 2

The catalyst precursor was the same composition as in Example 1 except that the silica was calcined at 600° C.

Example 3

The catalyst precursor of the same type as in Example 2 was prepared with silica calcined at 600° C. and at a TEOS loading of 0.44 mmol/g silica.

Example 4

The catalyst precursor was the same composition as in Example 3 except that the silica was calcined at 700° C.

Example 5

The catalyst precursor was the same composition as in Example 4 except that the silica was calcined at 800° C.

Slurry Polymerization Reactions

Examples 6–8

Ethylene/1-hexene copolymers were prepared with the catalyst precursors of Examples 3, 4, 5 in the presence of the cocatalyst triethylaluminum (TEAL). An example is given below:

A 1.6 liter stainless-steel autoclave equipped with a magnet-drive impeller stirrer was filled with heptane (700 ml) and 1 -hexene (300 ml) at 50° C. and then TEAL (2 mmol) was added. The stirring was increased to 1000 rpm, and the temperature was increased to 85° C. The internal pressure was raised 23 psi with hydrogen and then ethylene was introduced to maintain the total pressure at 105–110 psig. After that, the temperature was decreased to 80° C., 20.0–35.0 mg of a catalyst precursor was introduced into the reactor and the temperature was increased and was held at 85° C. The polymerization reaction was carried out for 1 hour and then the ethylene supply was stopped. The reactor was cooled to ambient temperature and the LLDPE resin was collected.

The slurry polymerization data are summarized in Table 1. Listed in the table are the catalyst productivities, polymer flow indexes and MFR values, and hexene contents in the copolymers (mole%). Catalyst productivities are given as grams of polymer per gram of catalyst in 1 hour at 100 psi ethylene pressure.

TABLE 1

Slurry Polymerization Data

| Polymerization Run | Catalyst Precursor | Calcination Temperature | Productivity | Flow Index | MFR | Mole % Hexene |
|---|---|---|---|---|---|---|
| Example 6 | Example 3 | 600° C. | 3900 | 31.8 | 30.9 | 4.0 |
| Example 7 | Example 4 | 700° C. | 4250 | 39.3 | 26.4 | 3.7 |
| Example 8 | Example 5 | 800° C. | 4300 | 31.5 | 26.7 | 3.3 |

Gas Phase Polymerization Reactions

Examples 9–12

Experiments were carried out in a gas-phase fluidized-bed polymerization reactor in the presence of TEAL as the cocatalyst. LLDPE resins with densities of ~0.918 g/cc were produced in all experiments. The results are given in Table 2.

TABLE 2

Gas Phase Polymerization Data

| Polymerization Run | Catalyst Precursor | Calcination Temperature | MFR | TEOS Loading mmol/g silica |
|---|---|---|---|---|
| Example 9 | Example 2 | 600° C. | 26–27 | 0.66 |
| Example 10 | Example 1 | 865° C. | 23–24 | 0.66 |
| Example 11 | Example 3 | 600° C. | 30–31 | 0.44 |
| Example 12 | Example 5 | 800° C. | 26–27 | 0.44 |

The slurry and gas-phase polymerization data show that catalyst precursors prepared with silica calcined at 700° C. or at higher temperatures and activated with a trialkylaluminum compound produce resins with a much more narrow MWD, as evident by the substantially lower MFR values, compared to the MWD of resins produced with a catalyst system which employs silica calcined at 600° C.

Resins with a more narrow MWD (lower MFR values) are highly desirable for LLDPE film applications because film properties of resins with a narrower MWD tend to be superior compared to those of resins with a broader MWD. This is shown in Table 3 where film properties of resins of Examples 11 and 12 are compared.

The resins were compounded on a Banbury mixer with a standard high strength film additive package and then the film was produced at 430° F. on a Gloucester extruder with 100 mil die-gap at a rate of 250 lb/hr, 2:1 BUR, and 25 inch FLH.

TABLE 3

Properties of 1 Mil LLDPE Film

|  | Example 11 | Example 12 |
|---|---|---|
| MI, dg/min | 0.9 | 0.9 |
| Density | 0.917 | 0.917 |
| MFR | 30–31 | 26–27 |
| FDA Ext., % | 3.7–4.0 | 3.4–3.7 |
| DDI, F50, g | 180–250 | 400–500 |
| MDT, g/mil | 300–360 | 400–475 |

What is claimed is:

1. In a process for making a supported polyolefin catalyst composition comprising silica as a support, wherein the process comprises calcining the silica at a temperature of at least 600° C., contacting the silica with a dialkylmagnesium compound to produce a magnesium containing intermediate, then contacting the magnesium containing intermediate with a tetraalkyl orthosilicate compound, with subsequent contact of the tetraalkyl orthosilicate contacted magnesium containing intermediate with an amount of titanium tetrachloride, and activating with a trialkylaluminum cocatalyst;

wherein the silica carrier contains hydroxyl groups;

wherein the dialkylmagnesium compound is used in an amount to provide a molar ratio of Mg to hydroxyl groups of about 1:1 to 4:1; and wherein a molar ratio of tetraalkyl orthosilicate compound to Mg is 0.40 to 1.00.

* * * * *